United States Patent
Hori et al.

(10) Patent No.: US 7,200,647 B2
(45) Date of Patent: Apr. 3, 2007

(54) COMMUNICATION DEVICE, FUNCTION SETTABLE TERMINAL DEVICE, FUNCTION SETTING METHOD AND PROGRAM FOR SETTING THE FUNCTION

(75) Inventors: Kiyoshi Hori, Kobe (JP); Hiroyuki Takaishi, Amagasaki (JP)

(73) Assignee: Kyocera Mita Corporation, Osaka (JP)

( * ) Notice: Subject to any disclaimer, the term of this patent is extended or adjusted under 35 U.S.C. 154(b) by 790 days.

(21) Appl. No.: 10/307,633

(22) Filed: Dec. 2, 2002

(65) Prior Publication Data
US 2003/0105842 A1    Jun. 5, 2003

(30) Foreign Application Priority Data
Nov. 30, 2001    (JP)    ............................. 2001-365525

(51) Int. Cl.
*G06F 15/177*    (2006.01)
(52) U.S. Cl. ...................... 709/220; 709/230; 709/203
(58) Field of Classification Search ................ 709/203, 709/217–219, 220, 230
See application file for complete search history.

(56) References Cited

U.S. PATENT DOCUMENTS

| | | | |
|---|---|---|---|
| 6,289,371 B1 * | 9/2001 | Kumpf et al. ............... | 709/203 |
| 6,633,913 B1 * | 10/2003 | Chalstrom et al. ........... | 709/226 |
| 6,691,918 B1 * | 2/2004 | Yoda et al. .................. | 235/454 |
| 6,978,296 B2 * | 12/2005 | Maeda et al. ................ | 709/219 |
| 7,010,569 B2 * | 3/2006 | Okayasu et al. ............. | 709/203 |
| 2001/0029521 A1 * | 10/2001 | Matsuda et al. ............. | 709/201 |
| 2002/0013725 A1 * | 1/2002 | Takakura et al. ............. | 705/10 |
| 2002/0046101 A1 * | 4/2002 | Ogawa et al. ................ | 705/14 |
| 2002/0120682 A1 * | 8/2002 | Funaki ........................ | 709/203 |

* cited by examiner

*Primary Examiner*—Philip B. Tran
(74) *Attorney, Agent, or Firm*—Jordan and Hamburg LLP

(57) ABSTRACT

In a communication device such as network scanner and image forming apparatus, function setting is made by using any one of a plurality of function apparatus, function setting is made by using any one of a plurality of function setting programs such as Web browser and dedicated utility software. The communication device is connected with personal computers via a network and is adapted to used a common protocol, e.g. HTTP, for the plurality of function setting programs. The function setting may be made directly on the communication device or by means of any one of the personal computers.

22 Claims, 5 Drawing Sheets

FIG.5

| ADDRESSEE | REGISTERED NAME | HOST NAME | HOLDER NUMBER |
|---|---|---|---|
| 1 | HORI | PC11a | 01 |
| 2 | | | |
| 3 | | | |
| 4 | | | |
| 5 | | | |
| . . . | | | |

REGISTER　CANCEL

COMMUNICATION DEVICE, FUNCTION SETTABLE TERMINAL DEVICE, FUNCTION SETTING METHOD AND PROGRAM FOR SETTING THE FUNCTION

BACKGROUND OF THE INVENTION

1. Field of Invention

The present invention relates to a communication device, function settable terminal device, method for setting function in such a communication device and terminal device, and a program for setting the function.

2. Description of the Related Art

A network system is constructed in which a sever, a printer, a facsimile machine, an image scanner and a plurality of terminal devices, such as personal computers are connected with one another by wires or by a wireless means for common use of the sever, printer, facsimile machine, image scanner and the like.

A DNS (Domain Name System) Server is generally provided in such a network system to control a host name and IP (Internet Protocol) Address. Accordingly, it is necessary to send the host name of the called party to the DNS Server and identify the a Address corresponding to the host name when communication is made among the devices and terminals.

A method has been provided in which a Web browser or a dedicated utility is used to set a function, such as registration of addresses of addressors, on a printer, facisimile machine, image scanner and the like. The Web browser requires no special knowledge for the function setting. One the other hand, the dedicated utility enables convenient operation such as copying, pasting, and the like and is useful for a lot of editing operations to be made in one time.

In general, Web browser uses HTTP (Hypertest Transport Protocol) while dedicated utilities use SNMP (Simple Network Management Protocol). Accordingly, communication devices such as the printer, facsimile machine and image scanner are designed to have specification adapted for both protocols.

However, the provision of the specification adapted for two kinds of protocols in a device results in increase of the size of program for the device and it is necessary to switch the kinds of program when an item of the function setting is to be changed or supplemented.

SUMMARY OF THE INVENTION

Accordingly, an object of the present invention is to provide a communication device in which function setting is available for two or more programs such as Web browser and a dedicated utility, and which has a small size of program for function setting and which program can be changed with less amount of operation than previously.

Another object of the present invention is to provide a function setting terminal device for setting one or more functions on a communication device, the terminal device being available for two or more programs such as Web browser and dedicated utility, and having a small size of program for the function setting which program can be changed with less amount of operation than previously.

Still another object of the present invention is to provide a method for setting one or more functions on a communication device, the method device being available for two or more programs such as a Web browser and a dedicated utility, and having a small size program for the function setting which program can be changed with less amount of operation than previously.

Further object of the present invention is to provide a program to be installed in a communication device according to which function setting is available for two or more programs such as a Web browser and a dedicated utility, and which has a small size program for the function setting which program can be changed with less amount of operation than previously.

To attain the above mentioned object, the function setting method according to the present invention uses a common protocol for two or more programs which are selectively used for setting functions in a communication device or editing the set functions.

According to the above mentioned invention, function setting in the communicating device is made by using a single common protocol for two or more programs such as Web browser and dedicated utility. Accordingly, the program for the function setting and/or editing is smaller in size in comparison with the conventional method which uses a plurality of protocols.

In addition, one program may be changed when an item of set functions is to be changed or supplemented, while the conventional method requires change of a plurality of programs.

According to another aspect of the present invention, a common protocol is used in a function setting method for setting functions in a communication device by means of a function setting terminal connected through a network, using selectively one of a plurality of programs.

With this method, function setting in the communication device is made on a function setting terminal device such as a personal computer.

It is to be noted that, in the above mentioned method, a protocol for Web browser may be used in function setting for two or more programs. According to another aspect of the present invention, the set function is edited in a communication device, by using two or more programs, and a single common protocol may be used for the two or more programs, thereby a communication device is provided which uses the above mentioned function setting method.

According to further aspect of the present invention, a common protocol is used for two or more programs and the condition set on a function setting terminal device is used in a communication device which receives the condition set on the function setting terminal device using any one of two or more programs.

In the above mentioned communication device, a protocol to be used for Web browser may be used for two or more programs.

The communication device may be a network scanner or an image forming device connected in a network.

According to still further aspect of the present invention, a function setting terminal device is used for setting functions for a communication device connected with the terminal device through a network, with any one of two or more programs being used for the function setting, and a common protocol is used for the two or more programs to set functions of the communication device through the function setting terminal device.

A dedicated utility program for setting functions in a communication device, according to yet another aspect of the present invention is designed to use a protocol that is common with that for Web browser, thereby realizing the above mentioned function setting method and communication device of the present invention.

The above and further objects and novel features of the invention will more fully appear from the following detailed description when the same is read in connection with the accompanying drawings. It is to be understood, however, that the drawings are for purpose of illustration only and are not intended as a definition of the limits of the invention.

BRIEF DESCRIPTION OF THE DRAWINGS

FIG. 5 shows a registering play screen for registering addressees using a dedicated utility.

DESCRIPTION OF THE PREFERRED EMBODIMENTS

Figure 1:
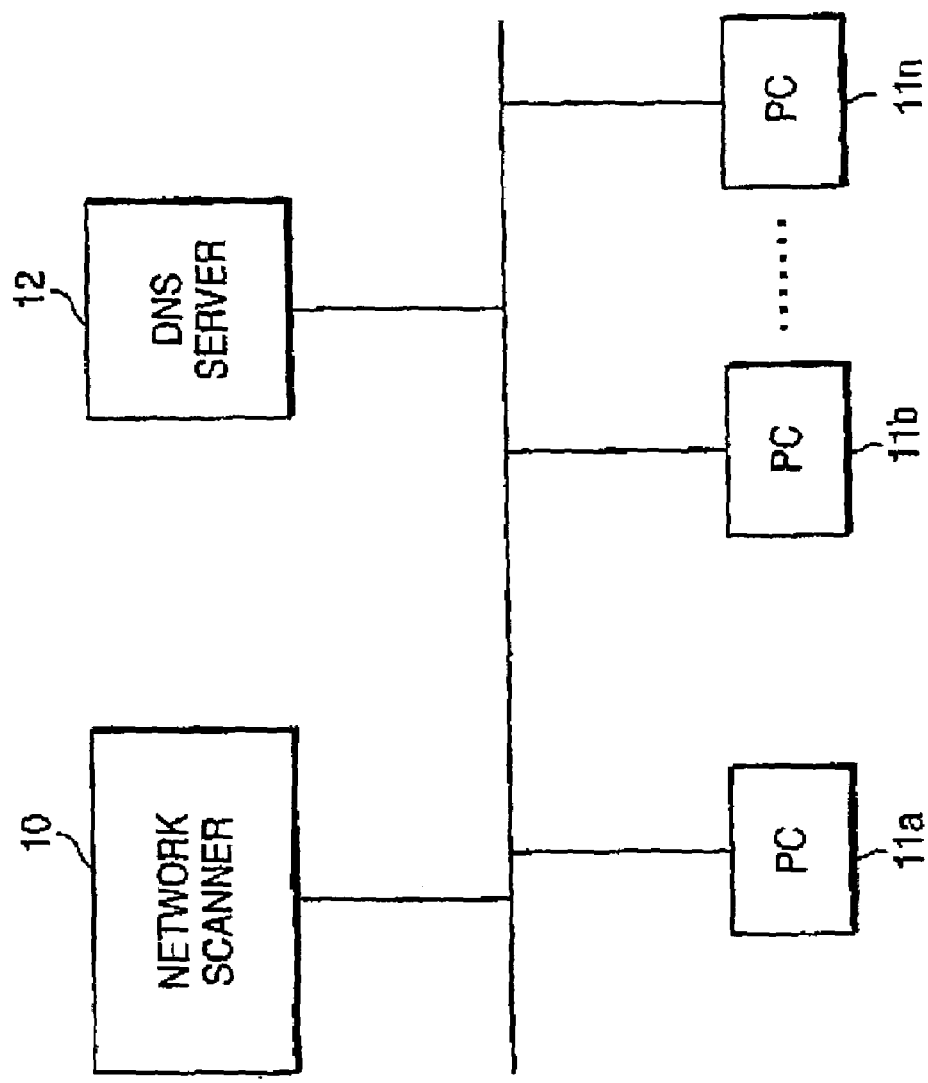
FIG. 1 is a block diagram showing a construction of a network system including a network scanner according to an embodiment of the present invention.

FIG. 1 is a block diagram showing a construction of a network system using a network scanner according to one embodiment of the present invention. The network system constructed by an in-house LAN and the like, is composed of a network scanner 10, a plurality of personal computers 11a through 11n as a function setting terminal devices, and DNS server 12. The network scanner reads image data and sends them to each of the terminal devices 11a through 11n. The DNS server 12 controls host names and IP addresses of the personal computers 11a through 11n.

Figure 2:
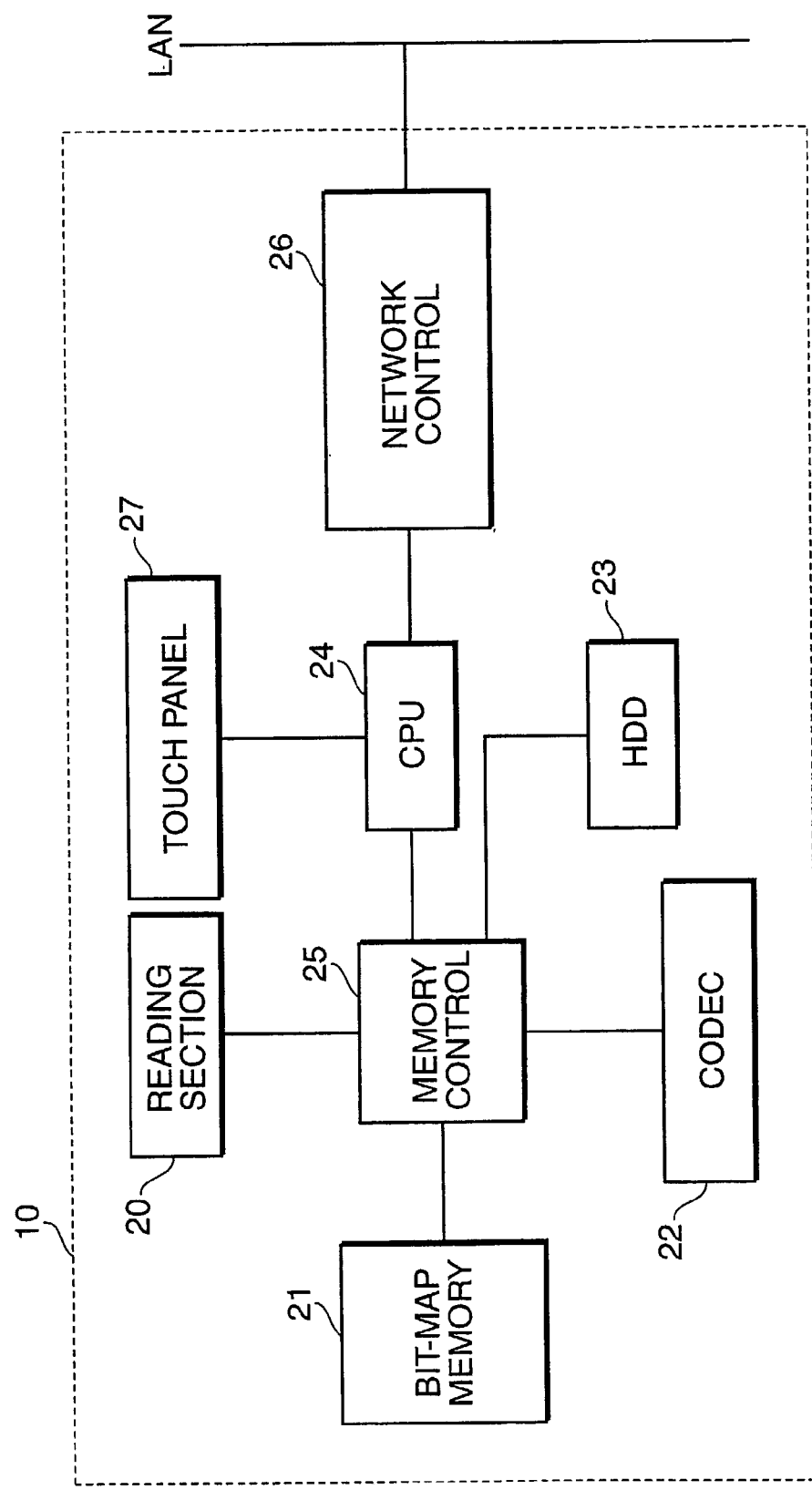
FIG. 2 is a block diagram showing a construction of the network scanner according to the embodiment of the present invention.

FIG. 2 is a block diagram showing the construction of the network scanner according to the embodiment of the present invention. The network scanner 10 includes a reading section 20 for reading image data, a bit-map memory 21 for temporally storing the image data read by the reading section 20, CODEC (Coder-decoder) for compressing the image data stored in the bit-map memory 21, a hard disk drive (HDD) 23, CPU 24, memory control 25, network control 26, and a touch panel 27.

The image reading section 20 converts an image of an original, such as a picture, a letter, a photographic picture, or the like, into electric signals by pixel unit, by means of line sensor, CCD (Charge Coupled Device) or the like. The CODEC 22 carries out MMR compression or JPEG compression of the image data stored in the bit-map memory 21. The HDD 23 obtains via the bit-map memory 21 the image data compressed by CODEC 22, and store the image date in itself. CPU 24 converts the image data supplied from the HDD 23, into TIFF·PDF format, and receives and sends by HTTP data for function setting from and to PC 11a through 11n. The memory control 25 is connected with reading section 20, bit-map memory 21, CODEC22, HDD 23 and CPU 24. The network control 26 is provided with a network interface card (NID) and is to be connected with LAN line. The touch panel 27 displays required data and is operated by an operator to input data therethrough by touching the panel.

The function setting in the network scanner 10, such as assigning and registering addressees to corresponding one touch keys, may be made by means of touch panel 27, or by means of any of the PCs 11a through 11n which are incorporated in the network system. At that time, Web browser or a dedicated utility software, or program, is used as a user interface. In conventional devices, HTTP is used for the Web browser as a protocol, while SNMP is used for the dedicated utility software. However, the present embodiment has a specification employing HTTP both for not only Web browser but also for the dedicated utility software so that HTTP is commonly used as the protocol. The utility software to be used may not be a single one, but a plurality of utility software may be used with HTTP.

With this common employment of HTTP, function setting can be made for the network scanner adapted for only HTTP even if any one of a plurality of programs such as Web browser, dedicated utility and the like is used in the setting. According to the embodiment of the present invention, a program may be smaller in size in comparison with the conventional system which is adapted for both HTTP and SNMP. In addition, only the program adapted for HTTP may be changed when it becomes necessary to change or supplement the program for the function setting, thereby dispensing with a double procedure of changing programs for both HTTP and SNMP as is required by the conventional system.

Next, explanation will be made about the operation to assign and register addressees to one touch keys (not shown in the Figure), utilizing the Web browser and the dedicated utility.

Figure 3:
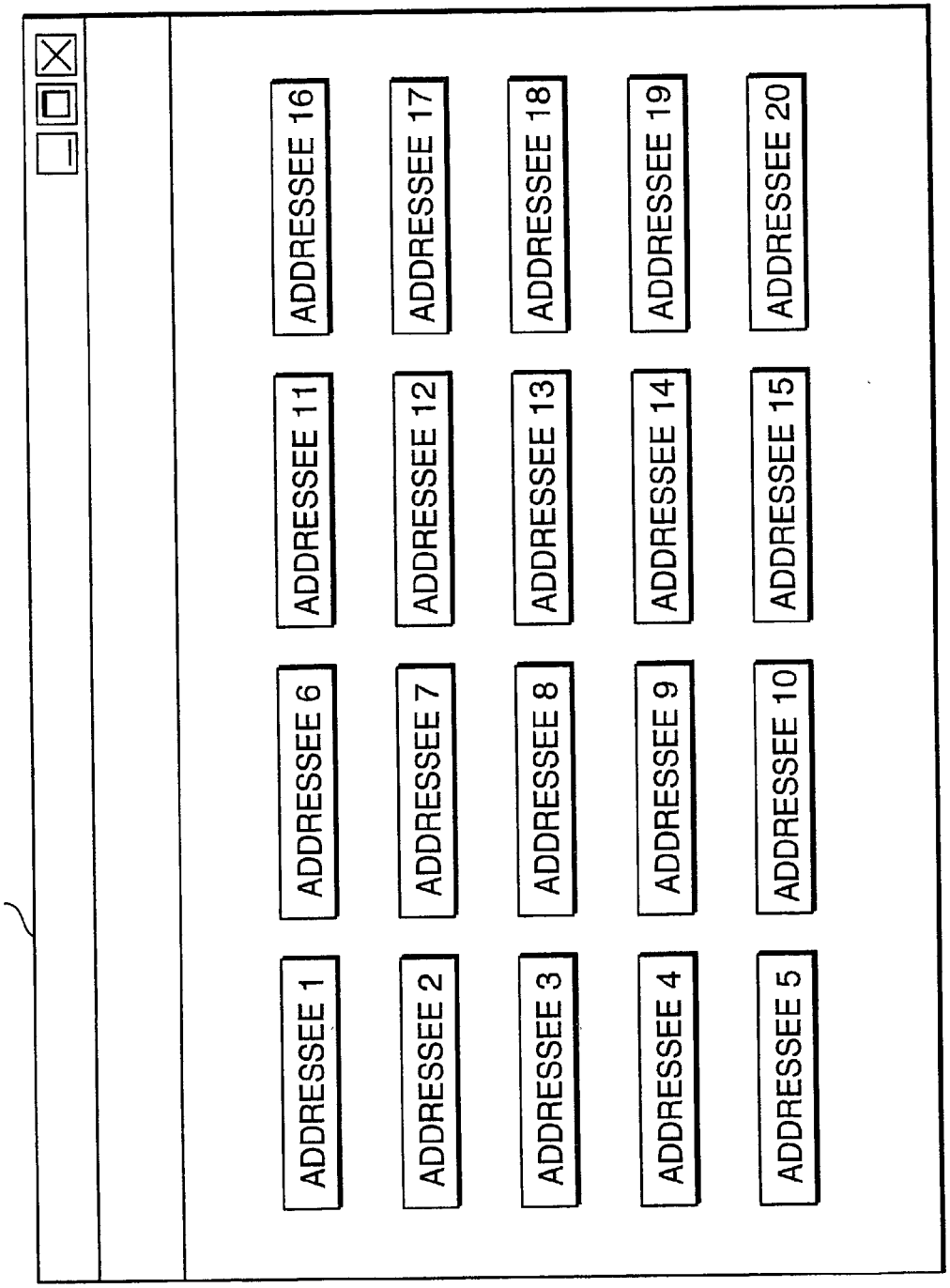
FIG. 3 shows a selection display screen for registering addressees using Web browser.
Figure 4:
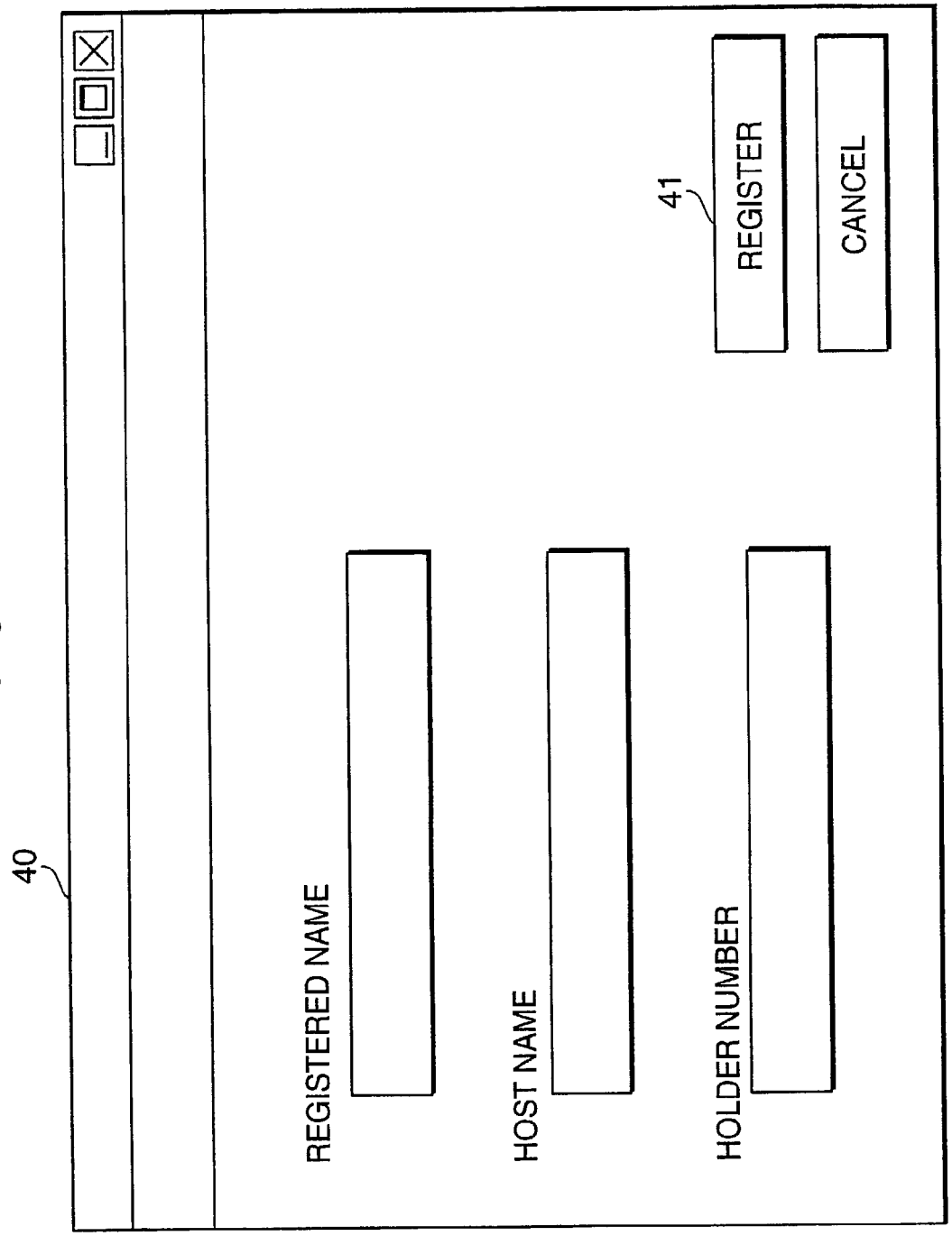
FIG. 4 shows a registering display screen for registering addressees using Web browser.

In case where Web browser is used to register the addressee, Web browser is started up, function setting for the network scanner 10 is selected (not shown) and an operation to register the addressees is selected. Then, a selection screen 30 as shown in FIG. 3 is displayed to enable setting of addressees of the desired number. If an addressee 1 is selected by for example, registering screen 40 as shown in FIG. 4 is displayed. With that display, an operator may input a registering name for the one touch key, a host name, holder number and the like, and finally touch or operate a registering button or mark 41 to complete the operation for registering at the addressee 1. Web browser requires any particular knowledge for the function setting.

Explanation is given below with respect to data sending operation between PC11a and network scanner 10 for the registering of addressees in response to the above mentioned registering operation. First, the PC11a obtains IPB address of the network scanner 10 by communicating with the DNS server 12. With the obtained IP address, PC 11a accesses network scanner to request function setting data. In response to the request, the network scanner 10 sends function setting data to PC 11a. The PC 11a accesses the network scanner 10 to obtain data for displaying on the screen at each time a page is renewed for the selection screen 30 and registering screen 40.

In the case where registering of addressees is made by means of a dedicated utility software, the dedicated utility software is started up on, for example, PC 11a to select function setting of network scanner 10 and to select register of addressees (not shown). Then, a registering screen as shown in FIG. 5 is displayed and a desired number of addressees may be registered. In case data have been registered at addressee 1 and further data are to be registered at addressee 1 and further data are to be registered at addressee 2 and on sequentially, the registered name, host name holder number and the like may be copied from the data for the addressee 1 and pasted to the data for the addressee 2 and others with the pasted data being changed to adapt the data to the new addressee so that registering operation is facilitated. The registering at addressees 2 and further on is completed when the register mark 51 is touched or operated after the all registration operation is completed. The utilization of the dedicated utility software is useful for registering a large amount of data at a time.

The above mentioned data sending disconnects communication at each page. Accordingly, in the conventional system, an IP address of the network scanner 10 is obtained from the DNS server 12 every time when PC 11a or other personal computer access the network scanner 10. According to the present invention, however, the PC may store the IP address of the network scanner 10 obtained once, and access the network scanner 10 using the stored IP address until completion of the function setting. Thus, the present embodiment requires about a half of communication time in comparison with the time required by the conventional system.

Although an embodiment of the present invention has been described with reference to network scanner as an example of communication, it will be apparent to those skilled in the art that the application is not limited to the network scanner but other various communication device such as image forming apparatus, e.g. a printer and facsimile, may be employed for that purpose.

According to the present invention, a common protocol is used for two or more programs for setting functions setting on a communication device, and function setting adapted for the common protocol can be made on a communication device when any one of a plurality of programs such as the Web browser, or the dedicated utility software is used for the function setting. Consequently, the program for the function setting is small in size in comparison with conventional systems. Also, only one program may be changed when it becomes necessary to change or supplement the item of the function setting, while the conventional system requires change of a plurality of programs.

This application is based on Japanese patent application No. 2001-365525 filed on Nov. 30, 2001, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A method for setting a functional configurations comprising:
providing a communication device configured to perform a communication data operation on communication data in accordance with a stored function configuration setting;
providing a computer terminal device configured to operate in accordance with at least one of a web browser program configured for browsing material on a world wide web and a dedicated utility program configured for setting a functional configuration of said communication device;
providing said web browser program configured to communicate using a predetermined protocol for browsing the world wide web;
providing said dedicated utility program configured to communicate using said predetermined protocol used by said web browser program;
configuring said communication device using an interfacing program to modify said stored function configuration setting based on data transferred by both said web browser and said dedicated utility program using said predetermined protocol;
interconnecting said communication device with said computer terminal device via a network and transferring said data over said network;
operating said computer terminal device using at least one of said web browser and said dedicated utility program to send said data and thereby effecting change of said stored function configuration setting based on receipt of said data transferred; and
operating said communication device to perform said communication data operation on said communication data using said stored function configuration setting.

2. The method of claim 1 further comprising updating said communication device to accommodate changes in said interfacing with both said web browser program and said dedicated utility program by updating a single program stored on said communication device, said interfacing program being said single program.

3. The method of claim 2 wherein said communication data operation includes transferring said communication data from said communication device to said computer terminal device based on said stored function configuration setting.

4. The method of claim 3 wherein said communication data operation includes scanning a document and converting said document to pixel based data as said communication data.

5. The method of claim 4 wherein said predetermined protocol is HTTP.

6. The method of claim 1 further comprising:
said computer terminal device being a first computer terminal device and including said web browser program;
providing a second computer terminal device configured to operate in accordance with said dedicated utility program configured for setting said functional configuration of said communication device;
interconnecting said communication device with said second computer terminal via said network and transferring said data over said network
operating said first computer terminal device using said web browser to send said data and thereby effecting change of said stored function configuration setting based on receipt of said data transferred;
operating said second computer terminal device using said dedicated utility program to send said data and thereby effecting change of said stored function configuration setting based on receipt of said data transferred;
operating said communication device to perform said communication data operation on said communication data using said stored function configuration setting as changed by operating said first computer terminal device; and
operating said communication device to perform said communication data operation on said communication data using said stored function configuration setting as changed by operating said second computer terminal device.

7. The method of claim 6 further comprising updating said communication device to accommodate changes in said interfacing with both said web browser program and said dedicated utility program by updating a single program stored on said communication device, said interfacing program being said single program.

8. The method of claim 7 wherein said communication data operation includes transferring said communication data from said communication device to said computer terminal device based on said stored function configuration setting.

9. The method of claim 8 wherein said communication data operation includes scanning a document and converting said document to pixel based data as said communication data.

10. The method of claim 9 wherein said predetermined protocol is HTTP.

11. The method of claim 1 wherein said predetermined protocol is HTTP.

12. A system comprising:
a communication device configured to perform a communication data operation on communication data in accordance with a stored function configuration setting;
a computer terminal device configured to operate in accordance with at least one of a web browser program configured for browsing material on a world wide web and a dedicated utility program configured for setting a functional configuration of said communication device;
said web browser program being configured to communicate using a predetermined protocol for browsing the world wide web;
said dedicated utility program being configured to communicate using said predetermined protocol used by said web browser program;
said communication device using an interfacing program to modify said stored function configuration setting based on data transferred by both said web browser and said dedicated utility program using said predetermined protocol;
said communication device being interconnected with said computer terminal device via a network and transferring said data over said network;
said computer terminal device using at least one of said web browser and said dedicated utility program to send said data and thereby effecting change of said stored function configuration setting based on receipt of said data transferred; and
said communication device performing said communication data operation on said communication data using said stored function configuration setting.

13. The system of claim 12 wherein said communication device is configured to accommodate changes in said interfacing with both said web browser program and said dedicated utility program by updating a single program stored on said communication device, said interfacing program being said single program.

14. The system of claim 13 wherein said communication data operation includes transferring said communication data from said communication device to said computer terminal device based on said stored function configuration setting.

15. The system of claim 14 wherein said communication data operation includes scanning a document and converting said document to pixel based data as said communication data.

16. The system of claim 15 wherein said predetermined protocol is HTTP.

17. The system of claim 12 further comprising:
said computer terminal device being a first computer terminal device and including said web browser program;
a second computer terminal device configured to operate in accordance with said dedicated utility program configured for setting said functional configuration of said communication device;
said communication device being interconnected with said second computer terminal via said network and transferring said data over said network
said first computer terminal device using said web browser to send said data and thereby effecting change of said stored function configuration setting based on receipt of said data transferred;
said second computer terminal device using said dedicated utility program to send said data and thereby effecting change of said stored function configuration setting based on receipt of said data transferred;
said communication device performing said communication data operation on said communication data using said stored function configuration setting as changed by operation of said first computer terminal device; and
said communication device performing said communication data operation on said communication data using said stored function configuration setting as changed by operation of said second computer terminal device.

18. The system of claim 17 further comprising said communication device is configured accommodate changes in said interfacing with both said web browser program and said dedicated utility program by updating a single program stored on said communication device, said interfacing program being said single program.

19. The system of claim 18 wherein said communication data operation includes transferring said communication data from said communication device to said computer terminal device based on said stored function configuration setting.

20. The system of claim 19 wherein said communication data operation includes scanning a document and converting said document to pixel based data as said communication data.

21. The system of claim 20 wherein said predetermined protocol is HTTP.

22. The system of claim 12 wherein said predetermined protocol is HTTP.

* * * * *